United States Patent
Lepilleur et al.

(10) Patent No.: US 6,306,945 B1
(45) Date of Patent: *Oct. 23, 2001

(54) HALOGEN CONTAINING POLYMER COMPOUNDS CONTAINING MODIFIED ZEOLITE STABILIZERS

(75) Inventors: Carole A. Lepilleur; Anthony M. Mazany, both of Akron; David L. Milenius, Rocky River; Arthur L. Backman, Brecksville, all of OH (US)

(73) Assignee: PMD Holdings Corporation, Brecksville, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,407

(22) Filed: Sep. 10, 1998

(51) Int. Cl.$^7$ .................................................. C08K 3/34
(52) U.S. Cl. ............................................................ 524/442
(58) Field of Search ................................................ 524/442

(56) References Cited

U.S. PATENT DOCUMENTS

| | | | |
|---|---|---|---|
| 2,848,346 | 8/1958 | Bertorelli | 106/288 |
| 2,882,243 | 4/1959 | Milton | 252/455 |
| 2,882,244 | 4/1959 | Milton | 252/455 |
| 2,979,381 | 4/1961 | Gottstine | 23/113 |
| 2,992,068 | 7/1961 | Haden et al. | 23/112 |
| 2,995,423 | 8/1961 | Breck et al. | 23/113 |
| 2,996,358 | 8/1961 | Milton | 23/113 |
| 2,996,489 | 8/1961 | Dannis et al. | 260/92.8 |
| 3,008,803 | 11/1961 | Milton | 23/113 |
| 3,010,789 | 11/1961 | Milton | 23/113 |
| 3,011,869 | 12/1961 | Breck et al. | 23/113 |
| 3,054,769 | 9/1962 | Pike | 260/37 |
| 3,071,434 | 1/1963 | Erlton et al. | 23/113 |
| 3,100,762 | 8/1963 | Shockney | 260/92.8 |
| 3,114,603 | 12/1963 | Howell | 23/113 |
| 3,130,007 | 4/1964 | Breck | 23/113 |
| 3,245,946 | 4/1966 | O'Connor | 260/41 |
| 3,313,594 | 4/1967 | Wilson, Jr. | 23/113 |
| 3,321,272 | 5/1967 | Kerr | 23/113 |
| 3,428,595 | 2/1969 | Tsukada et al. | 260/41 |
| 3,433,587 | 3/1969 | Haden, Jr. | 23/112 |
| 3,506,637 | 4/1970 | Makino et al. | 260/92.8 |
| 3,516,786 | 6/1970 | Maher et al. | 23/113 |
| 3,518,206 | 6/1970 | Sowards et al. | 252/446 |
| 3,528,615 | 9/1970 | Kokotailo | 241/1 |
| 3,532,612 | 10/1970 | Weben et al. | 204/159.18 |
| 3,534,013 | 10/1970 | Wakabayashi et al. | 260/92.8 |
| 3,591,571 | 7/1971 | Steinbach-Van Gaver | 260/92.8 |
| 3,730,943 | 5/1973 | Weisfeld | 260/45.75 |
| 3,842,016 | 10/1974 | Young et al. | 252/455 |
| 3,844,977 | 10/1974 | Young | 252/438 |
| 3,864,282 | 2/1975 | Young | 252/455 |
| 3,894,983 | 7/1975 | Higbee | 260/37 |
| 4,000,100 | 12/1976 | Baldyga | 260/23 |
| 4,049,517 | 9/1977 | Adachi et al. | 204/159.18 |
| 4,060,508 | 11/1977 | Sugahara et al. | 260/23 |
| 4,113,659 | 9/1978 | Michalko | 252/455 |
| 4,134,965 | 1/1979 | Rein et al. | 423/328 |
| 4,198,320 | 4/1980 | Chester et al. | 252/455 |
| 4,250,081 | 2/1981 | Bode et al. | 260/42.46 |
| 4,307,010 | 12/1981 | Sandler et al. | 260/42.47 |
| 4,338,226 | 7/1982 | Worschech et al. | 524/302 |
| 4,350,798 | 9/1982 | Parker | 525/331.6 |
| 4,371,656 | 2/1983 | Kashiwase et al. | 524/443 |
| 4,377,459 | 3/1983 | Parker | 204/159.18 |
| 4,400,366 | 8/1983 | Sanders | 423/329 |
| 4,406,822 | 9/1983 | Sanders et al. | 252/455 |
| 4,406,823 | 9/1983 | Laurent et al. | 252/455 |
| 4,412,898 | 11/1983 | Olson et al. | 204/159.18 |
| 4,540,727 | 9/1985 | Vogdes | 524/83 |
| 4,581,214 | 4/1986 | Young | 423/328 |
| 4,741,779 | 5/1988 | Mita et al. | 106/288 |
| 4,758,328 | 7/1988 | Young | 208/109 |
| 4,758,619 | 7/1988 | Mita et al. | 424/450 |
| 5,004,776 | 4/1991 | Tadenuma et al. | 524/377 |
| 5,200,058 | 4/1993 | Beck et al. | 208/46 |
| 5,216,058 | 6/1993 | Visneski | 524/357 |
| 5,216,088 | 6/1993 | Cinadr et al. | 515/356 |
| 5,340,880 | 8/1994 | Backman et al. | 525/331.6 |
| 5,534,566 | 7/1996 | Wehner et al. | 524/27 |
| 5,582,873 | 12/1996 | Desai | 427/412.4 |
| 5,645,811 | 7/1997 | Kuhm et al. | 423/700 |
| 5,739,188 | 4/1998 | Desai | 524/149 |

FOREIGN PATENT DOCUMENTS

| | | |
|---|---|---|
| 0091076 | 10/1983 | (EP) . |
| 0236602 | 9/1987 | (EP) . |
| 0394948 | 10/1990 | (EP) . |
| 59164618 | 9/1984 | (JP) . |
| 61295226 | 12/1986 | (JP) . |
| 4097908 | 3/1992 | (JP) . |
| 07108026 | 4/1995 | (JP) . |

OTHER PUBLICATIONS

Article Entitled, "Standard Test Method for Determination of the Impact Resistance of Thermoplastic Pipe and Fittings by Means of a Tup (Falling Weight)".
Article Entitled, "Standard Specification for Chlorinated Poly (Viny Chloride) (CPVC) Plastic Pipe, Schedules 40 and 80".
Article Entitled, "Standard Practice for Fusion of Poly (Vinyl Chloride) (PVC) Compounds Using a Torque Rheometer".
Journal of Applied Polymer Science, vol. 46, No. 1, Sep. 5, 1992, pp. 119–127, S. Stoeva et al., "Poly(vinyl chloride) Composition. II. Study of the Flammability and Smoke–Evolution of Unplasticized Poly(vinyl chloride) and Fire–Retardant Additives".

*Primary Examiner*—Peter D. Mulcahy
(74) *Attorney, Agent, or Firm*—Thoburn T. Dunlap; Valerie L. Calloway

(57) ABSTRACT

The present invention relates to a halogen containing polymer compound containing a modified zeolite stabilizer. The modified zeolite stabilizer has a small particle diameter, narrow particle size distribution and less than 10 weight percent water. The modified zeolite stabilizer is formed by shock annealing, coating or a combination of the two methods.

39 Claims, No Drawings

HALOGEN CONTAINING POLYMER COMPOUNDS CONTAINING MODIFIED ZEOLITE STABILIZERS

FIELD OF INVENTION

This invention relates to halogen containing polymer compounds. In particular, the invention relates to halogen containing polymers stabilized by modified zeolites. The modified zeolites have a small particle size, narrow particle size distribution, and a reduced water content. When incorporated into a halogen containing compound, the modified zeolites improve the processing stability of the compound and do not adversely diminish its physical properties. Furthermore, the invention relates to a halogen containing polymer compound stabilized by a modified zeolite and having improved processing stability. Moreover, this invention relates to a method of forming such a halogen containing polymer compound incorporating a modified zeolite therein.

BACKGROUND OF THE INVENTION

Halogen containing polymers tend to degrade or deteriorate when processed. Generally, the difference between the processing temperature and the degradation temperature is very small. Therefore, there is a risk that during the processing of these halogen containing polymers, that the polymer will degrade. When such polymers degrade, it is believed that the halide acid generated by the polymer attacks the components of the processing equipment. Also, this acid further catalyzes elimination reactions and additional degradation of the polymer.

Stabilizers have been developed to help deter such degradation. For example, organic compounds are commonly used. In some instances, zeolites have also been used as stabilizers.

Zeolites are effective acid scavengers for halogen containing polymers and enhance the thermal stability of halogen containing polymers. Acid scavengers are compounds that react with acids to form a compound that is typically chemically inert. However, the use of zeolites as stabilizers or acid scavengers in halogen containing polymer compounds has been limited for several reasons. First, the zeolites generally have a large particle size, generally in the range of about 3 to about 6 microns. The large size of the zeolite particles not only causes surface blemishes on the finish of the end product made from such a polymer but also diminishes the physical properties of such polymers. Further, outgassing occurs frequently with polymers containing zeolites when the polymer is heated during processing due to the evolution of water from the zeolite during the heating. As a result, there is foaming.

U.S. Pat. No. 4,000,100 discloses a thermal and light stabilized polyvinyl chloride resin. The stabilizer used in the composition comprises an unactivated zeolite A molecular sieve or an unactivated naturally occurring molecular sieve of essentially the same pore size range as zeolite A and a conventional inorganic, organometallic or organic stabilizer. The unactivated zeolite molecular sieve has adsorbed water molecules. According to the patentee, the combination of the unactivated zeolite and the conventional stabilizer produces a compound with allegedly improved stability as compared to a compounds produced with either of the two stabilizers separately.

Similarly, U.S. Pat. No. 4,338,226 discloses a process for the stabilization of polyvinyl chloride and stabilizer compositions. The patent describes admixing sodium aluminosilicate of small particle size (preferably, 0.1 to 20 microns), calcium salts of fatty acids, zinc salts of fatty acids, partial esters of polyols and fatty acids, thioglycolic acid esters of polyols and polyvinyl chloride or copolymer of vinyl chloride. An aluminosilicate that can be used is crystalline sodium zeolite A. The composition is used for molding mixtures.

U.S. Pat. No. 4,371,656 describes a metal substituted zeolite for use as a stabilizer for halogen containing resins. The stabilizer comprises a crystalline aluminosilicate substituted with ions of metallic elements belonging to Group II or Group IVA of the Periodic Table for the Group I (M) metal ion contained in the aluminosilicate. The stabilizer also must contain 10% by weight or less as $M_2O$ of residual Group I metal ions. The stabilizer, zeolite A, according to the patentee claims to have a water content of 8% by weight or less. This patent also discloses the use of organic substances to cover the voids of the zeolite particles and prevent moisture reabsorption.

Stabilized chloride containing resins are also described in U.S. Pat. No. 5,004,776. The stabilizer consists essentially of: (a) an overbased alkaline earth metal carboxylate or phenolate complex; (b) zeolite; (c) calcium hydroxide; and (d) a complex of at least one metal perchlorate selected from the group consisting of sodium, magnesium, calcium, and barium perchlorates with at least one compound selected from the group consisting of polyhydric alcohols and their derivatives. This stabilizer apparently prevents the discoloration and deterioration in physical properties of the chlorine containing resin resulting from thermal degradation when the resin is subject to thermoforming or exposed to a high temperature atmosphere for a long period of time.

Stabilizer compositions for use in halogen containing polymer are also described in U.S. Pat. No. 5,216,058. The stabilizer composition comprises hydrotalcite and a molecular sieve zeolite. The molecular sieve zeolite comprises a Group IA or IIA aluminosilicate.

U.S. Pat. No. 5,582,873 discloses an acid scavenger stabilized halogen containing organic polymer. The patent also describes the method for processing such a polymer. The composition comprises a halogen containing polymer, an zeolite as the acid scavenger and a heat stabilizer selected from the group consisting of mixed metal stabilizers, organtotin stabilizers, lead stabilizers, metal free stabilizers or any combination thereof. The acid scavengers are sodium zeolites which have a 13 to 25% water content, and a mean particle size of about 3 to about 5 microns.

Thus, there currently exists a need for a halogen containing polymer compound having improved process stability. In particular, a need exists for a stabilizer for a halogen containing compound comprising a modified zeolite which maintains the physical properties of the halogen containing polymer. More particularly, a need exists for a modified zeolite stabilizer for use in chlorinated polyvinyl chloride and polyvinyl chloride compounds. More particularly, there exists a need for a chlorinated polyvinyl chloride compound which has improved processability including excellent heat stability.

SUMMARY OF THE INVENTION

The present invention comprises novel halogen containing compounds with improved process stability. These compounds are made from a halogen containing polymer and a modified zeolite. The modified zeolite has a small particle size, a narrow particle size distribution and a water content of less than 10 weight percent. Furthermore, the present invention also comprises a method of forming such a compound.

DETAILED DESCRIPTION

As described above, the present invention comprises a composition of a halogen containing polymer and a modified zeolite, wherein such modified zeolite imparts stability to the halogen containing polymer and widens the range of temperatures which can be used in the processing of such halogen containing compounds. When incorporated into the compound, the modified zeolite does not contribute to the deterioration of the physical properties of the compound.

Examples of possible halogen containing polymers that can be used in the instant invention include polyvinyl chloride, chlorinated polyvinyl chloride, polyvinylidene chloride, polyvinyl bromide, polyvinyl fluoride, polyvinylidene fluoride, copolymers of vinyl chloride with a copolymerizable ethylenically unsaturated monomer such as vinylidenechloride, vinyl acetate, vinyl butyrate, vinyl benzoate, diethyl fumarate, diethyl maleate, other alkyl fumarates and maleates, vinyl propionate, methyl acrylate, 2-ethylhexylacrylate, butyl acrylate, ethyl acrylate, and other alkyl acrylates, methyl methacrylate, ethyl methacrylate, butyl methacrylate, hydroxyethyl methacrylate, and other alkyl methacrylates, methyl alpha-chloracrylates, styrene, vinyl ethers such as vinyl ethyl ether, vinyl chloroethyl ether, vinyl phenyl ether, vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene and polymer blends such as blends of polyvinyl chloride and polyethylene, polyvinyl chloride and chlorinated polyethylene, polyvinyl chloride and polybutyl-methacrylate and any combinations of the foregoing. The amount of the halogen containing polymer contained in the compound can range from about 70 to about 99 weight percent. However, the exact amount of the halogen containing polymer used in the compound is dependent upon its end use and is well within the purview of one of ordinary skill in the art.

Preferably, the halogen containing polymer is either polyvinyl chloride or chlorinated polyvinyl chloride. Most preferably, the halogen containing polymer is chlorinated polyvinyl chloride.

The polyvinyl chloride ("PVC") which can be used in the present invention preferably has an inherent viscosity in the range of 0.52 to 1.0; a fused density of about 1.35 grams/cubic centimeter and a chlorine content of about 56.7%. The PVC resin can be formed by mass, suspension or emulsion polymerization techniques. Examples of suitable PVC resins which can be used to form the halogen containing compounds of the instant invention include Geon 103EPF76TR, 103 EPF76, 30, 110X440, 27 and 1023PF5 PVC; all available from The Geon Company.

The PVC polymers can be homopolymers or copolymers of polyvinylchloride. These polymers generally have a density of about 1.40 grams/cubic centimeter. Copolymers of PVC are formed predominately with PVC and other copolymers such as for example vinyl acetate. Generally, the secondary monomer is present in the range of five percent. A further discussion of PVC copolymers can be found in Volume 1 of *Encyclopedia of PVC*, edited by Leonard I. Nass, Marcel Dekker, Inc. (N.Y. 1976, Chap.4).

Alternatively, PVC compounds can also be used. Examples of suitable PVC compounds include: Geon M6215 and M6230 rigid injection molding PVC; Geon 85890 and 85891 cellular injection molding PVC; Geon 8700A, 8700x, 87256, and 87160 interior rigid extrusion PVC; Geon 87416, 87703 and 6935 exterior rigid extrusion PVC; and Geon 85893, 87344, 87345, 87538, 87695 and 87755 rigid powder extrusion PVC. The various grades of the Geon PVC are commercially available from The Geon Company.

The most preferred halogen containing polymer used in the compound of the instant invention is chlorinated polyvinyl chloride. Chlorinated polyvinyl chloride ("CPVC") is known to have excellent high temperature performance characteristics, among other desirable physical properties. Typically, CPVC has an excess of 57% bound chlorine. CPVC is conveniently made by the chlorination of a polymer of vinyl chloride (PVC), which include both homopolymers and copolymers of vinyl chloride, having a chlorine content of up to 56.7%.

CPVC is obtained by chlorinating homopolymers or copolymers of PVC containing less than fifty percent (50%) by weight of one or more copolymerizable comonomers. Preferably, comonomers are not used. However, suitable comonomers include acrylic and methacrylic acids; esters of acrylic and methacrylic acid wherein the ester portion has from 1 to 12 carbons; hydroxyalkyl esters of acrylic and methacrylic acid (for example hydroxymethyl methacrylate, hydroxyethyl acrylate, hydroxyethyl methacrylate and the like); glycidyl ester of acrylic and methacrylic acid (for example glycidyl acrylate, glycidyl methacrylate and the like); alpha,beta-unsaturated dicarboxylic acids and their anhydrides (for example maleic acid, fumaric acid, itaconic acid and the like); acrylamide and methacrylamide; acrylonitrile and methacrylonitrile; maleimides; olefins (for example ethylene, propylene, isobutylene, hexene and the like); vinylidene halide; vinyl esters; vinyl ethers; crosslinking monomers (for example, diallyl phthalate, ethylene glycol dimethacrylate, methylene bis-acrylamide, divinyl ether, allyl silanes and the like).

Any post chlorination processes can be used to form CPVC polymer having more than fifty-seven percent (57%) by weight chlorine based upon the total weight of the polymer. Preferably, the CPVC polymer has a chlorine content in the range of about sixty percent (60%) to about seventy four percent (74%) by weight based upon the total weight of the polymer. The post chlorination processes which can be used include any commercial process or the like such as solution process, fluidized bed process, water slurry process, thermal process or liquid chlorine process or two step process which comprises post chlorinating the vinyl chloride polymer in the presence of a peroxy catalyst during both steps. In as much as the post chlorination processes are known to the art as well as the literature, they will not be discussed in detail here. Rather reference is hereby made to U.S. Pat. Nos. 2,996,049; 3,100,762; 4,412,898 3,532,612; 3,506,637; 3,534,013; 3,591,571; 4,049,517; 4,350,798; 4,377,459, 5,216,088 and 5,340,880 which are hereby fully incorporated by reference as to the method of forming CPVC by post chlorinating PVC. The preferred process in forming the CPVC from the PVC is the aqueous suspension process disclosed in U.S. Pat. No. 4,412,898.

In addition, blends of various CPVC resins can also be used. For example, the CPVC resin can be blended with PVC homopolymers or copolymers or with another CPVC resin in an amount of other resin of about 1 weight percent to about 50 weight percent. Additionally, the CPVC can also be blended from about 1 weight percent to about 50 weight percent with another other halogen containing polymer or polymers.

The CPVC used in the invention desirably will have a fused density in the range of approximately 1.38 to 1.65 grams/cubic centimeter at 25° Centigrade, an inherent viscosity (I.V.) in the range of about 0.52 to about 1.0 and a chlorine content of at least sixty percent (60%). The preferred fused density of the CPVC resin is in the range of about 1.51 to about 1.65 grams/cubic centimeter. The preferred inherent viscosity is in the range of about 0.68 to about 0.92. The preferred chlorine content of the CPVC is about 63% to about 70.5%. Examples of suitable CPVC resins to use in forming the compound of the instant invention include TempRite® 677×670 CPVC, and TempRite® 674×571 CPVC, all available from The B.F. Goodrich Company. TempRite® is a registered trademark of The B.F. Goodrich Company. The most preferred CPVC resin is TempRite® 674×571 CPVC resin.

Alternatively, CPVC compounds can be used in the compounds of the compound of the instant invention. Examples of suitable compounds which can be used include the following TempRite® CPVC compounds: 3104, 3210, 88038, 3107, 3109, 3114, 88738, 3105, 3214, 88971, 88027, 3219, 3205, 3212, 3206, 88023, 88033, 88955, SP220, 88745 and 3207 CPVC compounds. TempRite® is a registered trademark of The B.F. Goodrich Co. The above enumerated compounds are all commercially available from The B.F. Goodrich Co. in Cleveland, Ohio. The most preferred CPVC compound used in the instant invention is TempRite® 3104 CPVC compound.

The halogen containing polymer is stabilized by an effective amount of a modified zeolite. The modified zeolite should have a narrow particle size distribution, small particle size, and a reduced water content. Preferably, the zeolite should have a mean particle diameter in the range of about 0.25 to about 1.5 microns, a <90% value particle diameter (90% by weight of the particles are of a particle diameter below the range) of about 0.30 to about 3 microns, and a water content of less than 10 weight percent.

Zeolites comprise basically of a three dimensional framework of $SiO_4$ and $AlO_4$ tetrahedra. The tetrahedra are crosslinked through the sharing of oxygen atoms so that the ratio of oxygen atoms to the total of the aluminum and silicon atoms it equal to 2. This relationship is expressed as O/(Al+Si)=2. The electrovalence of the tetrahedra containing aluminum and silicon is balanced in the crystal by the inclusion of a cation. For example, the cation can be an alkali or alkaline earth metal ion. The cation can be exchanged for another depending upon the final usage of the aluminosilicate zeolite. The spaces between the tetrahedra of the aluminosilicate zeolite are usually occupied by water. Zeolites can be either natural or synthetic.

The basic formula for all aluminosilicate zeolites is represented as follows:

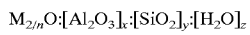

wherein M represents a metal, n represents the valence of the metal and X and Y and Z vary for each particular aluminosilicate zeolite. Essentially it is believed that any aluminosilicate zeolite can be used as a stabilizer in the instant invention, provided that the ratio of the silicon to aluminum in such aluminosilicate zeolite is less than 3.0 and that the aluminosilicate zeolite can be incorporated into the halogen containing polymer. Preferably, the zeolite ratio of silicon to aluminum in such aluminosilicate zeolite is less than 1.5. Most preferably, the ratio of silicon to aluminum in such aluminosilicate zeolite is about 1.

It is further believed that the following zeolites which can be used in the instant invention include but are not limited to zeolite A, described in U.S. Pat. No. 2,822,243; zeolite X, described in U.S. Pat. No. 2,822,244; zeolite Y, described in U.S. Pat. No. 3,130,007; zeolite L, described in Belgian Pat. No. 575,117 zeolite F, described in U.S. Pat. No. 2,996,358; zeolite B, described in U.S. Pat. No. 3,008,803; zeolite M, described in U.S. Pat. No. 2,995,423; zeolite H, described in U.S. Pat. No. 3,010,789; zeolite J, described in U.S. Pat. No. 3,011,869; and zeolite W, described in U.S. Pat. No. 3,102,853.

The preferred zeolites include alone or in combination with another Group I metal, hydrated silicates of aluminum incorporating sodium, of the type $mNa_2O.xAl_2O_3.ySiO_2.zH_2O$. These preferred zeolites include zeolites A, X, and Y. The most preferred zeolite is zeolite 4A. Zeolite 4A, preferably has the following formula:

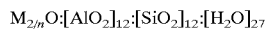

wherein M is sodium. Any method can be used to form such zeolite provided that the mean particle diameter of the zeolite is less than 1.5 microns, and <90% value particle diameter of about 0.30 to about 3 microns. Furthermore, when modified, this zeolite must have a water content of less than 10 weight percent and should provide for improved process stability when incorporated into a compound.

For example, a relatively simple process can be used to prepare the zeolite of the instant invention. First, the zeolite is synthesized. The exact synthesis will vary dependent upon the specific zeolite being used; this synthesis is well within the skill of one of ordinary skill in the art. Generally, however, a mixture of the aqueous solution of the materials which can be represented as mixtures of oxides, $Na_2O$; $Al_2O_3$; $SiO_2$ and $H_2O$ are reacted at a temperature in the range of about 50° C. to about 100° C. for a period of about 45 minutes to about 2000 minutes. Alternatively, the mixture of the reactants are allowed to age from about 0.1 to 48 hours at ambient conditions prior to the crystallization step. Preferably, the temperature of the reaction is in the range of about 50° C. to about 80° C. and the reaction is carried out for about 60 to 420 minutes. Most preferably, the temperature is 60° C. to 70° C. with a reaction of time of 90 to 300 minutes. The result of this reaction is a zeolite having a mean particle diameter in the range of about 0.25 to 1.5 microns. The <90 percent particle diameter value is in the range of about 0.30 to about 3.0 microns.

After the zeolite is formed, it is washed. The zeolite can be washed with deionized water, filtered and dried at about 100 to about 200° C., then dehydrated at about 250 to about 500° C. Any means available to dehydrate the zeolite can be used. It is believed that the zeolite has better reproductivity if dried. For example, the zeolite can be furnace dehydrated. If furnace dehydrated, any suitable furnace can be used provided that the desired temperature can be reached. Generally if furnace dehydrated, the zeolite is heated to approximately 250 to about 500° C. for about 2 to 6 hours. Alternatively, the small particle size zeolite can be dehydrated in vacuo at approximately 200° C. for about 2 to about 6 hours.

These aluminosilicate zeolites are then modified. The modified aluminosilicate zeolite has a water content of less than 10 weight percent. Any method which decreases the water content of the aluminosilicate zeolite can be used. For example, the aluminosilicate zeolite can be modified by chemically altering the surface of the zeolite particles, shock annealing or by a coating or by a combination of shock annealing and coating processes. The purpose of the modification is to prevent the aluminosilicate zeolite particles from absorbing water but still allowing the zeolite particles to react with the acid released upon the deterioration or degradation of the halogen containing polymer. If CPVC is the polymer used in the halogen containing compound, preferably, the water content of the modified aluminosilicate zeolite is less than 8 weight percent.

Any organic, inorganic or low molecular weight (<10,000) coating or coating mixture can be used provided that it has the following characteristics. First, in the case of inorganic coatings, they cannot be redox active; namely, the composition should have its d shell filled. Second, the coating cannot be water soluble or water permeable. Third, the coating should be reactive or permeable to the halogen acid. Fourth, the coating should not be a Lewis Acid. Preferably the coating used is miscible with the halogen containing polymer. Examples of suitable coatings include oxides such as magnesium oxide, paraffin waxes, low molecular weight organic matrices such as calcium stearate, high molecular weight matrices such as siloxanes, acrylic polymers such as methacrylate polymers. Preferably the coating is either dibutyl tin thioglyocalate or polydimethysiloxane.

The coating can be prepared in situ during the formation of the zeolite particles or applied to the zeolite particles in a separate step. If applied in a separate step, care should be taken to ensure the uniform application of the coating as well as to avoid clumping. Furthermore, the coating cannot be too thick or too thin, therefore, a balance must be obtained so as to ensure low water absorption but retain activity of the zeolite particles as acid scavenger.

Alternatively, the zeolite particles can be modified by shock annealing the particles. With the use of a shock annealing process for the zeolite particles, a phase transformation occurs at the outer surface of the zeolite particle shell. It is believed that the phase transformation causes the collapse of the zeolite structure at the outer surface. The shock annealing occurs at a temperature above the phase transformation temperature of the zeolites followed by rapid cooling. The shock annealing is carried out for the appropriate time to cause the outer surface of the particles to collapse. Exposure time to this temperature above the phase transformation temperature is however limited to minimize the bulk absorption of thermal energy and to limit the phase transformation to the outer surface of the particles. The temperature at which the zeolite is heated during the shock annealing process is dependent upon the particular zeolite being shock annealed. The temperature as well as the time to shock anneal is well within the skill of one of ordinary skill in the art.

One method to shock anneal the zeolite particles is disclosed in the copending application filed by the instant inventors, entitled "Zeolites and Method of Making Thereof", filed concurrently herewith. The contents of the application are incorporated in its entirety herein.

As described in the copending application, the zeolite particles are then placed in a furnace during the shock annealing step. Preferably, the particles are placed in a preheated crucible which can be made from quartz, high temperature steels or aluminum oxide. The crucible with the particles are returned to a muffle furnace. Any furnace can be used so long as it reaches the desired temperature. In the most preferred embodiment, an aluminum oxide crucible is preheated to approximately 700 to 1200° C. prior to the addition of the small particle size zeolite.

Once the zeolite is added, it is heated about 1 to about 30 minutes in the temperature range of about 700 to about 1200° C. After the zeolite particles are heated, as set forth in further detail in the copending application, they are cooled.

Any cooling means can be used so long as the temperature is cooled below the phase transformation temperature in a matter of seconds, for example, about 600° C. for zeolite 4A. Therefore, the particles can be cooled by air, water, carbon dioxide or liquid nitrogen.

Alternatively, the zeolite particles can be modified by both shock annealing and coating. If such a combination method is used to modify the zeolite particles, they are first shock annealed to within 15 to 10 percent of the desired optimum properties and then coated. By using both a coating and the shock annealing step, it may be possible to use other coatings which do not meet all the listed parameters set forth above with respect to the coatings.

The amount of the modified zeolite added to the halogen containing polymer to form the compounds of the instant invention is generally in the amount of about 0.5 to about 10 per one hundred parts of halogen resin used in the compound. Most preferably, the amount of modified zeolite added to the compound is in the range of about 0.4 to 7 weight percent of the compound. By adding the zeolite to the compound, the dynamic thermal stability of the compound as measured by ASTM D 2538 is increased from 10% to 300% compared to a control compound without zeolite.

In addition to the halogen containing polymer and the modified zeolite stabilizer, other ingredients typically added to halogen containing polymers can be included in the compounds of the instant invention. The amount and nature of these ingredients is dependent upon the end use of the halogen containing polymer. The ingredients and their amount can be tailored to meet the end-use needs by one of ordinary skill in the art.

For example, other stabilizers can also be used in conjunction with the modified zeolite stabilizer in the halogen containing polymer of the instant invention depending upon the halogen polymer used. Examples of possible stabilizers to use in halogen containing polymers include tin stabilizers, lead stabilizers, as well as stabilizers containing lithium, sodium, potassium, magnesium, calcium, strontium, barium, zinc, cadmium, aluminum, lead and antimony. Many of these enumerated stabilizers fall into a group of stabilizers called metal soap stabilizers. Metal soap stabilizers are metal carboxylates wherein the carboxylic acid typically has a chain length of 8 to 18 carbon atoms. Metal soap stabilizers can also include mixed metal soaps stabilizers. Examples of some mixed metal soap stabilizers include barium/cadmium, barium/cadmium/zinc, barium/zinc, barium/tin, barium/lead, cadmium/zinc, calcium/zinc, calcium/zinc/tin, strontium/zinc.

Suitable tin stabilizers include tin salts of monocarboxylic acids such as stannous maleate. Examples of tin stabilizers include without limitation: alkylstannoic acids, bis (dialkyltin alkyl carboxylate)maleates, dialkyltin bis (alkylmaleates), dialkyltin dicrotonates, dialkyltin diolates, dialkyltin laurates, dialkyltin oxides, dialkyltin stearates, alkylchlorotin bis(alkylmercaptides), alkylchlorotin bis (alkylmercaptopropionates), alkylthiostannoic acids, alkyltin tris(alkylmercaptides), alkyltin tris (alkylmercaptoacetates), alkyltin tris (alkylmercaptopropionates), bis[dialkyl (alkoxycarbonylmethylenethio)tin]sulfides, butyltin oxide sulfides, dialkyltin bis(alkylmercaptides), dialkyltin bis (alkylmercaptoacetates), dialkyltin bis (alkylmercaptopropionates), dialkyltin β-mercaptoacetates, dialkyltin β-mercaptoacetates, dialkyltin β-mercaptopropionates, dialkyltin sulfides, dibutyltin bis(i-octyl maleate), dibutyltin bis(i-octyl thioglycolate), dibutyltin bisthiododecane, dibutyltin β-mercaptopropionate, dimethyltin bis(i-octyl thioglycolate), dioctyltin laurate, methyltin tris(i-octyl thioglycolate). Examples of a commercially available tin stabilizer are Mark 292 and Mark 1900 stabilizers from Witco Chemical and Thermolite 31 stabilizer from Elf Atochem.

Lead stabilizers can also be used in the halogen containing compounds of the instant invention. Examples of lead stabilizers are dibasic lead stearate, tribasic lead stearate, dibasic lead phthalate, tribasic lead phosphite, basic lead silico-sulfate, tribasic lead sulfate, tetrabasic lead sulfate and lead carbonate.

Other co-stabilizers may be included in the compounds with the stabilizers if such stabilizers are used in addition to the modified zeolite stabilizer, and if desired, but are not necessary. However, if a solid co-stabilizer is added, the particle size of the co-stabilizer must be small enough so as not to affect the impact properties of the compounds described herein. Examples of co-stabilizers include metal salts of phosphoric acid, polyols, epoxidized oils, beta-diketones and acid acceptors which are not detrimental to the base halogen containing polymer used. The stabilizers can be used by themselves or in any combination as desired. Specific examples of metal salts of phosphoric acid include water-soluble, alkali metal phosphate salts, disodium hydrogen phosphate, orthophosphates such as mono-,di-, and tri-orthophosphates of said alkali metals, alkali metal polyphosphates, -tetrapolyphosphates and -metaphosphates and the like. Polyols such as sugar alcohols, and epoxides such as epoxidized soya oil can be used. Examples of possible acid acceptors include potassium citrate, aluminum magnesium hydroxy carbonate hydrate. An example of commercially available aluminum magnesium hydroxy carbonate hydrate is Hysafe 510, available from the J.M. Huber Company.

Chlorinated polyethylene (CPE) can also be added to the halogen containing polymer compound stabilized by the modified zeolite. The CPE is a rubbery material resulting from the chlorination of polyethylene having a substantially linear structure. The polyethylene can be chlorinated by various methods including aqueous suspension, solution or gas phase methods. An example of a method for preparing CPE can be found in U.S. Pat. No. 3,563,974. Preferably, the aqueous suspension method is used to form the CPE. If used as an impact modifier, the CPE material contains from 5 to 50% by weight of chlorine. Preferably, the CPE contains from 25 to 45% by weight of chlorine. However, the CPE can comprise a mixture of chlorinated polyethylenes, provided that the overall mixture has a chlorine content in the range of about 25 to 45% by weight chlorine. CPE is commercially available from The DuPont Dow Elastomer Company. The preferred CPE materials to be used in the compound include Tyrin 3611P, Tyrin 2000 and Tyrin 3615P; all available from the DuPont Dow Elastomer Company. Tyrin is a trademark of the DuPont Dow Elastomer Company.

The modified zeolite stabilized halogen containing polymer compound may also include acrylic impact modifiers. U.S. Pat. No. 3,678,133 describes the compositions conventionally referred to as acrylic impact modifiers. Generally, the acrylic impact modifier is a composite interpolymer comprising a multi-phase acrylic base material comprising a first elastomeric phase polymerized from a monomer mix comprising at least 50 wt. % alkyl methacrylate having 1–4 carbon atoms in the alkyl group and having a molecular weight of from 50,000 to 600,000. Further, the patent states that the polymerization of the rigid thermoplastic phase is preferably conducted in such a fashion that substantially all of the rigid phase material is formed on or near the surface of the elastomeric phase. Acrylic impact modifiers are polyacrylates including ($C_4$–$C_{12}$) acrylate homo or copolymers, second stage graft copolymerized with methyl methacrylate and styrene, poly(ethylhexyl acrylate-co-butyl-acrylate) graft copolymerized with styrene, and/or acrylonitrile and/or methyl methacrylate; polybutyl acrylate graft polymerized with acrylonitrile and styrene. Examples of suitable acrylic impact modifiers include Paraloid EXL-2330, KM 330, KM 334, and KM 365; all of which are available from Rohm and Haas. Paraloid is a trademark of the Rohm & Haas Company. Additionally Durastrength 200, available from Elf Atochem, and Kane Ace FM-10 and Kane Ace FM-25, available from Kaneka, are examples of commercially available acrylic impact modifiers.

Methyl butadiene styrene ("MBS") impact modifiers can also be added to the compounds of the present invention. MBS polymers are graft polymers. Generally, MBS impact modifiers are prepared by polymerizing methyl methacrylate or mixtures of methyl methacrylate with other monomers in the presence of polybutadiene or polybutadiene-styrene rubbers. Further information on MBS impact modifiers can be found in the Second Edition of the *Encyclopedia of PVC*, edited by Leonard I. Nass, Marcel Dekker, Inc. (N.Y. 1988, pp. 448–452). Examples of commercially available MBS impact modifiers include Paraloid KM 680, BTA 733, BTA 751, BTA 753 available from Rohm & Haas, Kane Ace B-22 impact modifier and Kane Ace B-56 impact modifier available from Kaneka.

Other additives can also be added to the halogen containing polymer compounds as needed. Conventional additives known in the art as well any other additives may be used, provided that the additive does not alter the physical properties and the process stability associated with the novel compounds. Examples of additives which can be used include antioxidants, lubricants, other stabilizers, other impact modifiers, pigments, glass transition enhancing additives, processing aids, fusion aids, fillers, fibrous reinforcing agents and antistatic agents. The amount and nature of the additives incorporated into the halogen containing compounds stabilized by the modified zeolite is well within the skill of one of ordinary skill in the art.

Exemplary lubricants are polyglycerols of di- and trioleates, polyolefins such as polyethylene, polypropylene and oxidized polyolefins such as oxidized polyethylene and high molecular weight paraffin waxes. Since several lubricants can be combined in countless variations, the total amount of lubricant can vary from application to application. Optimization of the particular lubricant composition is not within the scope of the present invention and can be determined easily by one of ordinary skill in the art. Preferably, an oxidized polyethylene is used. An example of an oxidized polyethylene is AC 629A, sold by Allied Signal. In addition to the oxidized polyethylene, preferably a paraffin wax is also included in the compounds of the instant invention. An example of a paraffin wax is Paraffin 160F Prill from Witco.

Suitable processing aids include acrylic polymers such as methyl acrylate copolymers. Examples of process aids include Paraloid K-120ND, K-120N, K-175; all available from Rohm & Haas. A description of other types of processing aids which can be used in the compound can be found in The Plastics and Rubber Institute: *International Conference on PVC Processing*, Apr. 26–28 (1983), Paper No. 17.

An example of antioxidants to be used in the halogen containing compounds include Irganox 1010 (tetrakis

[methylene(3,5-di-tert-butyl-4-hydroxy-hydrocinnamate)] methane) sold by Ciba, if used at all.

Suitable pigments include among others titanium dioxide, and carbon black. Examples of titanium dioxide is Tiona RCL-6 and RCL-4 from Millenium Inorganics. An example of carbon black is Raven 410, available from Columbian Chemicals.

Suitable inorganic fillers include talc, clay, mica, wollastonite, silicas, and other filling agents.

The components of the unique compound can be made in any manner wherein the various components are added together and mixed under heat. For example, the appropriate amount of the halogenated resin or halogen compound can be added to a vessel such as Henschel mixer or a ribbon blender. The remaining ingredients of the compound can then be added thereto and mixed until the blend is homogeneous. If pellets are to be formed, the compound can be melt mixed. Melt mixing can generally occur in the temperature range of about 150 to about 250° C., if CPVC is the halogenated resin used as the base polymer to form the instant compound. Once the blend is formed, it can be processed further depending upon the desired application in any conventional manner, using extrusion or molding techniques.

If extrusion techniques are used to process the composition of the present invention, generally conventional extrusion machinery such as a multiscrew extruder or a single screw extruder are used. An extruder generally has conveying means, an intermediate screw processing means and a final die through which the material is discharged in the form of an extrudate. Generally, a multi-screw extruder is used for the extrusion of pipe. Examples of possible conventional extruders to be used to process the CPVC and PVC compounds containing the modified zeolite include the following twin screw counterrotating extruder models from Cincinnati Milacron: CM 35HP, CM 55HP, CM 65HP, CM 80HP, CM 92HP. Examples of suitable conical twin screw extruders from Krauss Maffei include KMD-2/40KK and KMD-2/50KK.

If the halogen containing polymer compound contains CPVC and is made according to the instant invention, it has the following characteristics: a tensile strength in the range of about 5,000 to about 10,000 psi (as measured according to ASTM D 638–95); a Notched Izod in the range of about 1.0 to about 20 ft.lb. per inch of notch (as measured according to ASTM D 256-93A); a dynamic thermal stability in the range of about 20 to about 60 minutes as measured by ASTM D 2538); a heat distortion temperature in the range of about 80 to about 140° C. (as measured by ASTM D 648-95). Generally, the compound containing the modified zeolite maintains approximately 90% of its physical properties as compared to the same compound without the modified zeolite. This novel compound can be formed into any article desired. Examples include but are not limited to sheet, pipe, ducts, fittings, valves, injection molded and thermoformed industrial parts, appliance housing, fabricated parts, and different containers.

The following non-limiting examples serve to further illustrate the present invention in greater detail.

EXAMPLE I

A zeolite 4A powder was synthesized by individually preparing the following solutions: a sodium silicate solution, a sodium aluminate solution and a sodium hydroxide solution. The sodium silicate solution was prepared by dissolving 255.6 grams of $Na_2SiO_3.9H_2O$ in 650 grams of water. The sodium aluminate solution was prepared by dissolving 270.0 grams of $NaAlO_2$ in 320 grams of water and the sodium hydroxide solution was prepared by adding 500 grams of NaOH in 650 grams of water. An additional solution of 10.0 grams of $ZnCl_2$ and 90.0 grams of water was also prepared. All solutions were maintained at about 55° C. after all solids are dissolved. The sodium hydroxide solution was then added with stirring to the sodium aluminate solution. The resulting sodium aluminate/sodium hydroxide solution was added concurrently with the zinc chloride solution to the sodium silicate solution, again with stirring. The reaction temperature was maintained at 60° C. for 2 hours and then filtered and rinsed. A zeolite 4A produced by this method exhibited the following properties.

The particle size of the zeolite powder as determined using a Coulter LS Particle Size Analyzer was as follows: a mean particle diameter of 0.9 $\mu$m and <90% value of 1.8 $\mu$m.

A sample dehydrated at 350° C. exhibited a weight gain of 22% after 2 days of exposure to ambient conditions. In contrast, most commercially available zeolites will exhibit a moisture gain of about 18 to about 22 weight % within 48 hours.

The Dynamic Thermal Stability (DTS) measured according to ASTM D 2538 of a TempRite® 3104 CPVC compound (commercially available from The B.F. Goodrich Company) was evaluated with and without the above zeolite using a Brabender torque rheometer set at a 208° C. bowl temperature, 35 rpm and a 70 gram loading. The DTS time of the TempRite® 3104 CPVC control was 13 minutes and with the addition of 3 parts per hundred resin (phr) of the zeolite 4A prepared according to Example I to the TempRite® 3104 CPVC compound, the DTS time was increased to 36 minutes, a 157% increase over the control value. The DTS increase is defined as ($DTS_{zeolite\ containing}$ $-DTS_{control\ (no\ zeolite)}/DTS_{control} \times 100\%$). A longer DTS time is indicative of a compound with enhanced stability.

EXAMPLE II

A 20.0 gram portion of a dehydrated zeolite prepared according to Example I was calcined by gradually heating to 840° C. for one (1) hour and cooled to room temperature gradually under vacuum. The resulting material exhibited virtually no weight gain due to water uptake upon exposure to ambient conditions for 500 hours. The DTS time of the TempRite® 3104 CPVC was unchanged upon addition of 3 phr of the calcined zeolite (0% increase over control DTS value, indicating that the zeolite has lost its reactivity under those calcination conditions).

EXAMPLE III

An 100 mL $Al_2O_3$ crucible was heated to 840° C. in a muffle furnace. The crucible was extracted from the furnace and a 20.0 gram portion of a dehydrated zeolite prepared according to Example I was added to the crucible which was then returned to the furnace and heated for 15 minutes. The heated zeolite powder was then poured into another crucible at room temperature immediately after removal from the furnace. The resulting material exhibited 0.7% weight gain due to water uptake upon exposure to ambient conditions after 48 hours. The DTS time of the TempRite® 3104 control was increased upon addition of 3 phr of the shock-annealed zeolite from 13 minutes to 30 minutes (131% increase over control DTS value).

EXAMPLES IV–XX

Another zeolite 4A powder was synthesized by individually preparing the following solutions: (1) a sodium silicate solution; (2) a sodium aluminate solution; and (3) and a sodium hydroxide solution. The sodium silicate solution was prepared by dissolving 255.6 grams of $Na_2SiO_3 \cdot 9H_2O$ and 10 grams of $C_{11}H_{23}COOH$ in 650 grams of water. The sodium aluminate solution was prepared by dissolving 270.0 grams of $NaAlO_2$ in 320 grams of water and the sodium hydroxide solution was prepared by adding 500 grams of NaOH in 650 grams of water. An additional solution of 10.0 grams of $ZnCl_2$ and 90.0 grams of water was also prepared. All solutions were maintained at about 55° C. after all solids were dissolved. The sodium hydroxide solution was then added with stirring to the sodium aluminate solution. The resulting sodium aluminate/sodium hydroxide solution was added concurrently with the zinc chloride solution to the sodium silicate solution, again with stirring. The reaction temperature was maintained at about 60° C. for 2 hours and then filtered and rinsed.

A 100 ml $Al_2O_3$ crucible was heated to 840° C. in a muffle furnace. The crucible was extracted from the furnace and a 20.0 gram portion of a dehydrated zeolite prepared according to Example I was added to the crucible which was then returned to the furnace and heated for 15 minutes. The heated zeolite powder was the poured into a stainless steel cup cooled with dry ice immediately after removal from the furnace. The resulting material exhibited 0.4% weight gain due to water uptake upon exposure to ambient conditions after 48 hours. The DTS time of the TempRite® 3104 control was increased upon addition of 3 phr of the shock-annealed zeolite from 14 minutes to 29 minutes (107% increase over control DTS value). Similarly prepared zeolites were shock-annealed according to the parameters tabulated below in Table I:

TABLE I

| Example | Coolant | Temperature (° C.) | Time (min) | $H_2O$ Uptake (%) | DTS (min) | % Increase in DTS |
|---|---|---|---|---|---|---|
| 4 | air | 840 | 15 | 0.8 | 30.5 | 118% |
| 5 | air | 840 | 15 | 1.0 | 33.6 | 140% |
| 6 | air | 790 | 20 | 1.1 | 28.0 | 100% |
| 7 | air | 830 | 15 | 1.1 | 33.4 | 139% |
| 8 | air | 785 | 20 | 1.2 | 30.5 | 118% |
| 9 | air | 810 | 15 | 1.5 | 33.3 | 138% |
| 10 | $CO_{2(s)}$ | 840 | 15 | 0.4 | 29.4 | 110% |
| 11 | $CO_{2(s)}$ | 820 | 15 | 0.8 | 33.6 | 140% |
| 12 | $CO_{2(s)}$ | 830 | 15 | 0.9 | 33.0 | 136% |
| 13 | $CO_{2(s)}$ | 810 | 15 | 1.1 | 31.9 | 128% |
| 14 | $CO_{2(s)}$ | 820 | 15 | 1.5 | 34.0 | 143% |
| 15 | $CO_{2(s)}$ | 800 | 15 | 3.9 | 31.4 | 124% |
| 16 | $CO_{2(s)}$ | 840 | 10 | 4.4 | 33.3 | 138% |
| 17 | $CO_{2(s)}$ | 790 | 15 | 5.7 | 32.5 | 132% |

TABLE I-continued

| Example | Coolant | Temperature (° C.) | Time (min) | $H_2O$ Uptake (%) | DTS (min) | % Increase in DTS |
|---|---|---|---|---|---|---|
| 18 | $CO_{2(s)}$ | 820 | 10 | 6.7 | 31.0 | 121% |
| 19 | $CO_{2(s)}$ | 750 | 15 | 8.0 | 34.0 | 143% |
| 20 | $CO_{2(s)}$ | 770 | 15 | 10.5 | 34.5 | 146% |

The (s) subscript in the table with $CO_2$ indicates that the carbon dioxide was solid. The examples show that a balance of activity (DTS) and % $H_2O$ uptake can be achieved with various conditions (temperature, time, cooling conditions).

EXAMPLES XXI–XXXII

Another series of zeolite 4A powders were synthesized by individually preparing the following solutions: (1) a sodium silicate solution, (2) a sodium aluminate solution; and (3) a sodium hydroxide solution. The sodium silicate solution was prepared by dissolving 255.6 grams of $Na_2SiO_3 \cdot 9H_2O$ in 650 grams of water. The sodium aluminate solution was prepared by dissolving 270.0 grams of $Na_2AlO_3$ in 320 grams of water, and the sodium hydroxide solution was prepared by adding 500 grams of NaOH in 650 grams of water. All solutions were maintained at about 55° C. after all the solids were dissolved. An additional solution of 10.0 grams of $ZnCl_2$ and 90.0 grams of water was also prepared and used as shown in the table below. 10 grams of $C_{11}H_{23}COOH$ was also added to the sodium silicate solution as also shown in the table below. The sodium hydroxide solution was then added with stirring to the sodium aluminate solution. The resulting sodium aluminate/sodium hydroxide solution was added concurrently with the zinc chloride solution (when used) to the sodium silicate solution, again with stirring. The reaction temperature was maintained at 60° C. for 2 hours and then filtered and rinsed.

A 100 mL $Al_2O_3$ crucible was heated to 840° C. in a muffle furnace. The crucible was extracted from the furnace and a 20.0 gram portion of a dehydrated zeolite prepared accordingly was added to the crucible which was then returned to the furnace and heated for 15 minutes. The heated zeolite powder was then poured into a $Al_2O_3$ crucible at room temperature and cooled immediately after removal from the furnace. The resulting material exhibited the weight gain tabulated below due to water uptake upon exposure to ambient conditions after 48 hours. The DTS time of the TempRite® 3104 CPVC control was increased upon addition to 3 phr of the respective zeolite from 14 minutes to the value also tabulated below in Table II:

TABLE II

| Example # | $ZnCl_2$ added | $C_{11}H_{23}COOH$ added | Shock-Annealed | Particle Size mean diameter (μm) | Particle Size median diameter (μm) | Particle Size <90% (μm) | DTS min. | % Increase in DTS | % $H_2O$ uptake (@ 48 hrs.) |
|---|---|---|---|---|---|---|---|---|---|
| 21 | yes | yes | yes | 1.4 | 1.1 | 2.9 | 28 | 100% | 0.6% |
| 22 | yes | yes | no | 1.7 | 1.2 | 2.5 | 38 | 171% | 12.3% |
| 23 | yes | no | yes | 1.5 | 1.1 | 2.6 | 27 | 93% | 1.0% |
| 24 | yes | no | no | 1.4 | 1.1 | 2.5 | 35 | 150% | 14.1% |
| 25 | no | yes | yes | 2.1 | 1.4 | 5.6 | 25 | 79% | 0.5% |
| 26 | no | yes | no | 1.9 | 1.6 | 4.1 | 32 | 129% | 10.9% |
| 27 | no | no | yes | 11.8 | 6.9 | 5.6 | 27 | 93% | 0.8% |
| 28 | no | no | no | 27.3 | 14.9 | 91.9 | 30 | 114% | 2.1% |
| 29 | yes | yes | yes | 1.4 | 1.1 | 2.2 | 27 | 93% | 1.0% |

TABLE II-continued

| | | | | Particle Size | | | | | |
|---|---|---|---|---|---|---|---|---|---|
| Example # | ZnCl$_2$ added | C$_{11}$H$_{23}$COOH added | Shock-Annealed | mean diameter ($\mu$m) | median diameter ($\mu$m) | <90% ($\mu$m) | DTS min. | % Increase in DTS | % H$_2$O uptake (@ 48 hrs.) |
| 30 | no | no | no | 1.9 | 1.5 | 4.7 | 31 | 121% | 12.0% |
| 31 | commercial zeolite | commercial zeolite | yes | 4.3 | 4.0 | 7.1 | 22 | 57% | 2.8% |
| 32 | commercial zeolite | commercial zeolite | no | 3.9 | 3.6 | 6.5 | 34 | 143% | 16.2% |

This series of experiments was designed to examine the effects of ZnCl$_2$, C$_{11}$H$_{23}$COOH and shock-annealing on particle size distribution to balance the zeolite reactivity and H$_2$O uptake as well as the impact of failing to shock anneal on the Dynamic Thermal Stability of the compound. The commercial zeolite used in these examples was molecular sieve zeolite 4A, having a mean particle size of less than 5 microns, available from Aldrich and bearing product number 23,366-8 (lot #03024-JQ). In Example #28, a zeolite was not formed under the noted conditions.

EXAMPLE XXXIII

Another zeolite 4A powder was synthesized by individually preparing the following solutions: sodium silicate, sodium aluminate and sodium hydroxide solutions. The sodium silicate solution was prepared by dissolving 195 g of Na$_2$SiO$_3$. 5H$_2$O and 1.5 g. of sodium lauryl sulfate in 525 g. of water. The sodium aluminate solution was prepared by dissolving 115 g. of NaAlO$_2$ and 415 g. of water wherein a solution of NaOH is added comprising 210 g. of NaOH in 420 g. of water. The resulting sodium aluminate/sodium hydroxide solution was added to the sodium silicate solution while stirring at room temperature. A thick gel was instantaneously formed. Agitation was continued for a couple of minutes until a consistent mixture was obtained. The system was aged for about 16 hours at room temperature. After this period of aging, the agitation was started again and the system was brought to 60° C. The reaction temperature was maintained for 3 hours. The solution was then filtered and rinsed.

The zeolite 4A powder (as confirmed by X-ray diffraction) has a mean particle diameter of 0.35 $\mu$m and <90% value of 0.50 $\mu$m as determined using a Coulter LS Particle Size Analyzer.

A sample dehydrated at 350° C. exhibited a weight gain of 22% after 4 days of exposure at ambient conditions. The dynamic thermal stability (DTS) measured according to ASTM D 2532 in a TempRite® 3104 CPVC compound (commercially available from The B.F. Goodrich Company) was evaluated with and without the above zeolite 4A, using a Brabender torque rheometer set at 208° C. bowl temperature, 35 rpm and a 70 g. loading. The DTS time of the TempRite® 3104 CPVC control was 20 minutes. With the addition of 3 parts per hundred resin (phr) of the zeolite 4A prepared according to this example, to the TempRite® 3104 compound, the DTS time was increased to 35 minutes, illustrating an increase of 75% in thermal stability.

EXAMPLE XXXIV

A commercial zeolite 4A powder (Aldrich product #23, 366-8, (lot #03024 JQ)) has the following particle size distribution as determined using a Coulter LS Particle Size Analyzer: a mean particle diameter of 2.5 $\mu$m, a median particle diameter of 2.4 $\mu$m and a <90% value of 4.6 $\mu$m. A sample dehydrated at 350° C. exhibited a weight gain of 21% after 2 days of exposure to ambient conditions.

A 100 mL Al$_2$O$_3$ crucible was heated to 840° C. in a muffle furnace. The crucible was extracted from the furnace and a 20.0 gram portion of the dehydrated commercial zeolite described above was added to the crucible, which was then returned to the furnace and heated for 15 minutes. The heated zeolite powder was then poured into another crucible at room temperature immediately after removal from the furnace. The resulting material exhibited 1.0% weight gain due to water uptake upon exposure to ambient conditions after 48 hours. The DTS time of the TempRite® 3104 CPVC control was increased upon addition of 3 phr of the shock-annealed zeolite from 16 minutes to 31.5 minutes (97% increase in DTS).

EXAMPLE XXXV

A commercial zeolite 4A powder (Aldrich product #23, 366-8, (lot #03024JQ)) has the following particle size distribution as determined using a Coulter LS Particle Size Analyzer: a mean particle size of 2.5 $\mu$m, a median particle size of 2.4 $\mu$m and a <90% value of 4.6 $\mu$m. A sample dehydrated at 350° C. exhibited a weight gain of 21% after 2 days of exposure to ambient conditions.

A 100 mL Al$_2$O$_3$ crucible was heated to 820° C. in a muffle furnace. The crucible was extracted from the furnace and a 20.0 gram portion of a dehydrated commercial zeolite described above was added to the crucible, which was then returned to the furnace and heated for 15 minutes. The heated zeolite powder was then poured into a stainless steel cup cooled with dry ice immediately after removal from the furnace. The resulting material exhibited 3.2% weight gain due to water uptake upon exposure to ambient conditions after 48 hours. The DTS time of the TempRite® 3104 CPVC control was increased upon addition of 3 phr of the shock-annealed zeolite from 13 minutes to 25 minutes (92% increase in DTS).

EXAMPLE XXXVI

TempRite® 3210 CPVC compound (available from The B.F. Goodrich Co.) was injection molded using various zeolites as heat stabilizers.

The zeolite 4A used in this experiment was synthesized in the laboratory as described previously in Example IV. The zeolite 13X was synthesized in the laboratory as described in U.S. Pat. No. 3,808,321 with the following initial reactant ratios: H$_2$O/Na$_2$O=37.4, Na$_2$O/SiO$_2$=1.3, SiO$_2$/Al$_2$O$_3$=3. The zeolite 13×powder produced (as determined by X-ray diffraction) has a mean particle size of 1.5 $\mu$m and <90% value of 2.1 $\mu$m as determined using a Coulter LS Particle Size Analyzer. Both zeolites were dried in a furnace at 450° C. for 24 hours prior to compounding. The ingredients were combined into a Banbury mixer until the melt mix temperature reached 385° F., then the mixture was rolled into sheets before cubing. Bars were injection molded at 430° F. for various testing (tensile, impact and heat distortion). The physical properties as well as a description of the chemical composition and particle size of the zeolites are summarized in Table III.

The Congo Red Test was measured in accordance with DIN Standard 53381, Part 1. The Notched Izod was measured according to ASTM D 256-93A, the drop impact, and the vice crush according to ASTM F 441, the tensile tests according to ASTM D 638-95 and the heat distortion temperature (HDT) according to ASTM D 648-95.

This example shows that a CPVC compound containing a small particle size zeolite with 8 wt. % moisture content will exhibit poor physical properties due to the outgassing during processing.

EXAMPLE XXXVIII

Another experiment was carried out on a commercial high heat CPVC compound, TempRite® 3214 CPVC where zeolite 4A was used at various concentrations. The zeolite 4A characteristics used for each run are described in the following table (particle size and moisture content). The zeolites in runs 2b through 2d were synthesized as described in Example IV and were shock annealed at 840° C. for 15 min. Agglomeration of the individual particle appears after annealing as indicated by the particles size distribution in

TABLE III

| Description | 1a Control- TempRite ® 3210 Compound | 1b TempRite ® 3210 CPVC with Zeolite 13X added | 1c TempRite ® 3210 CPVC with Zeolite 4A added |
|---|---|---|---|
| Amount of zeolite added (phr) | 0.0 | 1.5 | 1.5 |
| Mean particle diameter (in microns) | — | 1.5 | 1.7 |
| DTS @ 215 deg C. (min) | 10 | 21 | 20 |
| Congo Red test (min) | 35 | 52 | 56 |
| Heat Distortion Temperature (deg C.) | 104 | 105 | 104 |
| Notched Izod (ft. lb./in.) | 2.9 ± 0.2 | 2.0 ± 0.4 | 2.7 ± 0.2 |
| Tensile Strength (psi) | 8320 | 8370 | 8560 |
| Tensile Modulus (Kpsi) | 340 | 362 | 368 |
| Tensile Elongation (%) | 15 | 12 | 21 |

This experiment illustrates that the use of a small particle size zeolite with reduced water content increases the thermal stability of a CPVC compound while retaining good physical properties such as impact, tensile and HDT.

EXAMPLE XXXVII

A similar experiment was carried out on a commercial high heat CPVC compound, TempRite® 3214 CPVC where a small particle size zeolite 4A containing 8 wt. % of water was used at 2 phr. The zeolite 4A properties used for the run are described in the following Table IV (particle size and moisture content). The zeolite 4A was synthesized as described in Example XXIII and was shock annealed at 740° C. for 15 min. in exactly the same manner as described above. Bars were injection molded at 460° F. and physical properties of the molded samples recorded in Table IV.

TABLE IV

| Compound | Control | Compound 1 |
|---|---|---|
| Zeolite Concentration (phr) | 0 | 2 |
| <90% Particle diameter (μm) | — | 0.7 |
| Mean particle diameter (μm) | — | 0.47 |
| H₂O Content (%) | — | 8.5 |
| Notched Izod (ft. lb/in) | 2.2 ± 0.2 | 1.6 ± 0.1 |
| Tensile Strength (psi) | 8590 ± 69 | 8700 ± 43 |
| Tensile Modulus (Kpsi) | 396 ± 13 | 407 ± 11 |
| Tensile Elongation (%) | 13 | 13 |
| HDT (° C.) | 111 ± 2 | 114 ± 3 |

Table V. Run 2e contains a commercial zeolite 4A from Aldrich which was not dried. Bars were injection molded at 460° F. as described above and physical properties of the molded samples recorded.

TABLE V

| Compound | 2a | 2b | 2c | 2d | 2e |
|---|---|---|---|---|---|
| Zeolite Concentration (phr) | 0 | 1.5 | 1.5 | 3 | 1.5 |
| <90% Particle diameter (μm) | — | 3.2 | 3.2 | 3.2 | 5.7 |
| Mean particle diameter (μm) | — | 1.2 | 1 | 1 | 3.2 |
| Comments | — | Aggregates at 4 to 8 μm | Aggregates at 4 to 10 μm | Aggregates at 4 μm | Does not Aggregate |
| H₂O Content (%) | | 0.5 | 0.5 | 0.5 | 18% |
| Notched Izod (ft.lb/in) | 1.8 | 1.2 | 1.2 | 0.9 | 0.8 |
| Tensile Strength (psi) | 8640 | 8800 | 8940 | 8960 | 8950 |
| Tensile Modulus (Kpsi) | 408 | 416 | 426 | 427 | 409 |
| Tensile Elongation (%) | 15 | 12.7 | 11.2 | 12 | 15 |
| HDT (° C.) | 117 ± 0 | 119 ± 0 | 118.5 ± 5 | 120 ± 0 | 117.5 ± 5 |
| Congo Red Test (min.) | 21.5 | 40.1 | 35.4 | 57.7 | 43.7 |
| Visual Appearance (3/4" | burned | good | good | good | surface moisture |

TABLE V-continued

| Compound | 2a | 2b | 2c | 2d | 2e |
|---|---|---|---|---|---|
| coupling) | | | | | |

This example shows that a CPVC compound containing a large particle size zeolite with no moisture content will exhibit better thermal stability and processing as compared to the control but poor physical properties.

EXAMPLE XXXIX

Physical properties were measured on commercial CPVC compound TempRite® 3107 CPVC with the addition of zeolite 4A synthesized as described in Example XXXIII. The zeolite samples were dried at 450° C. for 24 hours. The zeolite was coated with either 33 wt. % butyl tin stabilizer (Mark 292, available from Witco Chemical) or 37.5 wt % of polydimethylsiloxane oil, (SF100, available from GE Plastics) under high shear mixing at room temperature. The polymeric coating was applied to prevent water reabsorption. The compounds were mixed on a Henschel Mixer at 3600 rpm for 15 min. at 200° F., then rolled into sheets at 400° F. before plaques were pressed. Bars were cut to measured physical properties as set forth in Table VI.

TABLE VI

| | Control | 1 | 2 | 3 |
|---|---|---|---|---|
| TempRite ® 3107 CPVC (phr) | 100 | 100 | 100 | 100 |
| Amount of zeolite added (phr) | 0 | 2 | 2 | 2 |
| <90% Zeolite particle diameter ($\mu$m) | — | 0.6 | 0.6 | 0.6 |
| Zeolite mean particle diameter ($\mu$m) | — | 0.4 | 0.4 | 0.4 |
| Coating | — | Mark 292 33 wt. % | SF100 37 wt. % | None |
| % H$_2$O in Zeolite | — | 1.8 | 1.8 | 0 |
| Notched Izod (ft. lb/in) | 9.5 ± 0.8 | 9.6 ± 0.9 | 10.5 ± 0.2 | 10.2 ± 0.5 |
| Tensile Strength (psi) | 7720 ± 52 | 7430 ± 18 | 6650 ± 177 | 7510 ± 62 |
| Tensile modulus (Kpsi) | 335 ± 21 | 355 ± 21 | 337 ± 17 | 338 ± 10 |
| Tensile Elongation (%) | 5.2 ± 0.2 | 4.7 ± 0.1 | 4.7 ± 0.1 | 5.1 ± 0.2 |
| HDT (° C.) | 102 | 100 | 108 | 108 |

This example shows that a CPVC compound containing a small particle zeolite with reduced moisture content will retain good physical properties as compared to the control.

EXAMPLE XXXX

Notched Izod Impact and thermal stability were measured on commercial CPVC compound 3107 with the addition of a zeolite 4A, synthesized as described in Example XXXIII, or in the alternative, commercially available zeolite from Aldrich. The zeolite samples were dried at 450° C. for 24 hours. Bars were cut to measure impact properties. The results are summarized in the Table VII.

TABLE VII

| | Control | 1 | 2 | 3 | 4 | 5 |
|---|---|---|---|---|---|---|
| TempRite ® 3107 CPVC (phr) | 100 | 100 | 100 | 100 | 100 | 100 |
| Amount of zeolite added (phr) | 0 | 2 | 2 | 2 | 2 | 2 |
| <90% Zeolite particle diameter ($\mu$m) | — | 0.6 | 0.6 | 4.6 | 4.6 | 4.6 |
| Zeolite mean particle diameter ($\mu$m) | — | 0.4 | 0.4 | 2.5 | 2.5 | 2.5 |
| Coating | — | Mark 292 33 wt % | None | None | SF100 33 wt % | Mark 292 33 wt % |
| % H$_2$O in Zeolite | — | 1.8 | 0 | 18 | 2.4 | 2.4 |
| Notched Izod (ft.lb.in) | 6.9 ± 0.9 | 7.4 ± 0.5 | 7.3 ± 0.5 | 2.5 ± 0.2 | 2.7 ± 0.1 | 2.1 ± 0.1 |
| DTS (% Increase of Control) | — | 55% | 55% | 55% | 95% | 66% |

The DTS increase in Table VII and the application is defined as (DTS$_{zeolite\ containing}$−DTS$_{control\ (no\ zeolite)}$/DTS$_{control}$× 100%

This example shows that a small particle size zeolite with reduced moisture content is necessary to achieve improved thermal stabilization than while retaining good impact properties in CPVC.

EXAMPLE XXXXI

Two compounds using Geon 103EPF76 PVC resin from The Geon Company were made in the following manner. The ingredients were mixed in a Farrel intensive mixer, removed at 330° F. and worked on the KSBI 10'×20' mill with the front roller set at 420° F. and the back roller set at 400° F. Plaques were then cut out of the worked material and compression molded to ¼ in thickness. Bars were then cut from the plaques for Notched Izod according to ASTM D 256-93A. The remaining compound was cubed and strips (3 inch wide and 0.035 inches thick) were extruded using a Brabender ¾ inches diameter single screw extruder at 195° C. Variable Height Impact Testing (VHIT) was measured on the strips according to ASTM D 4226. A commercial zeolite from Aldrich was used in this case and had a large particle size (as described in the Table VIII) and was shock annealed at 800° C. for 1 hour to prevent any water adsorption. The following recipe was used:

| | |
|---|---|
| PVC 103EPF76 | 100 phr |
| Dibutyl tin bis-(2ethylhexylmercapto acetate) | 2 |
| Titanium dioxide | 6 |
| Calcium stearate | 1 |
| Acrylic processing aid | 1.5 |
| Impact modifier | 6 |
| Shock annealed commercial zeolite | 4 |

TABLE VIII

| | Control | Compound 1 |
|---|---|---|
| Zeolite content | 0 | 4 |
| <90% Zeolite Particle diameter ($\mu$m) | — | 5.7 |
| Mean Particle diameter ($\mu$m) | — | 3.2 |
| H$_2$O content (%) | — | 0 |

TABLE VIII-continued

|  | Control | Compound 1 |
| --- | --- | --- |
| Izod impact (ft.lb./in.) | 2.6 ± 0.1 | 1.8 ± 0.4 |
| VHIT impact (in.lb./in.) | 2.1 ± 0.1 | 1.85 ± 0.1 |

This example illustrates that a commercially available zeolite with reduced water content yields poorer Izod impact and VHIT impact values in a PVC compound as compared to the control.

EXAMPLE XXXXII

Two compounds using PVC 103EPF76 resin from The Geon Company were made in the following manner. The ingredients were mixed in an Henschel mixer at 3600 rpm for 15 min. Strips (2 inches wide and 0.035 inches thick) were extruded at 200° C. via a Haake conical twin screw extruder at 200° C. The zeolite used in this case was prepared as described in Example XXXIII and dried in a furnace at 450° C. before use. Its characteristics are summarized in the following table. Variable Height Impact Test (VHIT) values were measured on the strips to quantify impact properties (ASTM D 4226). The following recipe was used:

| | |
| --- | --- |
| PVC 103EPF76 | 100 phr |
| Dibutyl tin bis-(2ethylhexylmercapto acetate) | 1.6 |
| Titanium dioxide | 1 |
| Calcium stearate | 1.5 |
| Paraffin wax | 1.5 |
| Oxidized polyethylene | 0.1 |
| Acrylic processing aid | 1.0 |
| Impact modifier | 5 |

The following results were obtained:

TABLE IX

|  | Control | Compound 1 |
| --- | --- | --- |
| Zeolite content | 0 | 2 |
| <90% Zeolite Particle diameter (μm) | — | 0.6 |
| Mean Particle diameter (μm) | — | 0.35 |
| H₂O content (%) | — | 0 |
| VHIT values (in.lb./in.) | 2.43 ± 0.18 | 2.45 ± 0.13 |

This example illustrates that a small particle size zeolite with reduced water content yields good impact properties as illustrated by the VHIT values of the PVC strips.

EXAMPLE XXXXIII 3 phr of a commercial zeolite 4A powder (as received, Aldrich #23,366-8, lot #03024-JQ) was added to a commercial CPVC compound (TempRite® 3104 CPVC). The zeolite had the following particle size distribution: a mean particle diameter of 2.5 μm, a median particle diameter of 2.4 μm and a <90% value of 4.6 μm using a Coulter LS Particle Size Analyzer. The same sample dehydrated at 350° C. exhibited a weight gain of 21% after 2 days of exposure to ambient conditions. The DTS time of the TempRite® 3104 CPVC control was increased upon addition of 3 phr of the commercial zeolite from 13 minutes to 33 minutes (154% increase in DTS). However, staircase drop impact at 22.8° C. dropped 52% (control: 25 ft.lbs. vs. compound with zeolite 4A: 12 ft.lb.) and hoop stress at 82.2° C. dropped 16% (control: 4900 psi vs. compound with zeolite 4A: 4120 psi) as measured on extruded ¾ inch SDR 11 pipe prepared from TempRite® 3104 CPVC.

EXAMPLE XXXXIV 3 phr of a shock-annealed commercial zeolite 4A powder (Aldrich zeolite 4A, shock-annealed at 840° C. for 15 minutes) was added to a commercial CPVC compound (TempRite® 3104 CPVC). The particle size distribution of the shock-annealed zeolite was determined as follows: a mean particle diameter of 3.1 μm, a median particle diameter of 3.1 μm and a <90% value of 5.7 μm using a Coulter LS Particle Size Analyzer. The shock-annealed sample exhibited a weight gain due to water uptake of <2% after 2 days of exposure to ambient conditions. The DTS time of the TempRite® 3104 CPVC control was increased from 16 minutes to 33 minutes (106% increase in DTS). However, the staircase drop impact at 22.8° C. dropped 44% (control: 25 ft.lb. vs. compound with shock-annealed zeolite: 14 ft.lb.) and hoop stress at 82.2° C. dropped 9% (control: 4900 psi vs. compound with shock-annealed zeolite: 4460 psi) as measured on extruded ¾ inch SDR 11 pipe prepared from TempRite® 3104 CPVC.

EXAMPLE XXXXV

Polyvinyl chloride was mixed with various additives to prepare a siding compound, using the following formulation (in parts by weight) in Table X:

TABLE X

| Material | Manufacturer | Parts |
| --- | --- | --- |
| PVC resin (IV = 0.92, Geon 130 EPF 76-TR) | Geon Co. | 100.0 |
| Calcium stearate | Witco | 1.3 |
| Paraffin wax | Witco | 1.0 |
| Oxidized polyethylene, AC 629 | Allied Signal | 0.1 |
| Acrylic process aid, Paraloid K-120ND | Rohm & Haas | 1.25 |
| Acrylic toughener | Rohm & Haas | 6.0 |
| Titanium dioxide, Tioxide RFC-6 | Tioxide | 10.0 |
| Methyl (thioglycolato) tin (IV)-based stabilizer, Mark 1900 | Witco | 0.5 or 1.5 |
| Shock-annealed zeolite | Example IV | 0.0, 2.0 or 4.0 |

The zeolite was synthesized and shock-annealed as outlined in Example IV. The formulation was well mixed and charged to a torque rheometer and, run at the following conditions (ASTM D 2532) set forth in Table XI:

TABLE XI

| | |
| --- | --- |
| Bowl setting (temperature) | 170° C. |
| Rotor rate (RPM) | 60 |
| Preheat time | 3 min. (at 5–10 rpm) |
| Compound loading | 67 grams |

The formulation was continuously mixed at high temperature until degradation occurred, as evidenced by a substantial change in torque. Results in Table XII show that the addition of the shock-annealed zeolite considerably enhanced the stability time observed for the PVC capstock/unitary construction siding formulation.

TABLE XII

| Example | Tin stabilizer (parts) | Shock-annealed zeolite (parts) | DTS time (min.) | % DTS Increase | Rotor conditions |
|---|---|---|---|---|---|
| A | 0.5 | 0.0 | 14 | 0% | Clean |
| B | 0.5 | 2.0 | 24 | 71% | Clean |
| C | 0.5 | 4.0 | 29 | 107% | Clean |
| D | 1.5 | 0.0 | 29 | 0% | Clean |
| E | 1.5 | 2.0 | 43 | 48% | Clean |
| F | 1.5 | 4.0 | 60 | 107% | Clean |

EXAMPLE XXXXVI

Polyvinyl chloride was mixed with various additives to prepare a pipe fittings compound, using the following formulation (in parts by weight)in Table XIII:

TABLE XIII

| Material | Manufacturer | Parts |
|---|---|---|
| PVC resin (IV = 0.72) | Geon Co. | 100.0 |
| Calcium stearate | Witco | 0.8 |
| Paraffin wax | Witco | 0.8 |
| Oxidized polyethylene | Allied Signal | 0.1 |
| Acrylic process aid | Rohm & Haas | 1.0 |
| MBS toughener | Rohm & Haas | 5.0 |
| Titanium dioxide | Tioxide | 1.0 |
| Calcium carbonate | Pfizer | 3.0 |
| Methyl (thioglycolato) tin(IV) -based stabilizer | Witco | 0.5 or 1.0 |
| Shock-annealed zeolite (Example IV) | Example IV | 0.0, 2.0 or 4.0 |

The zeolite was synthesized and shock-annealed as described in Example IV. The formulation was well mixed and charged to a torque rheometer, run at the following conditions (ASTM D 2532) in Table XIV:

TABLE XIV

| Bowl setting (temperature) | 170° C. |
|---|---|
| Rotor rate (RPM) | 60 |
| Preheat time | 3 min. (at 5–10 rpm) |
| Compound loading | 67 grams |

The formulation was continuously mixed at high temperature until degradation occurred, as evidenced by a substantial change in torque. Results in Table XV showed that the addition of the shock-annealed zeolite considerably enhanced the stability time observed for the PVC fitting formulation.

TABLE XV

| Example | Tin Stabilizer (parts) | Shock-annealed zeolite (parts) | DTS time (min.) | % DTS Increase | Rotor Conditions |
|---|---|---|---|---|---|
| G | 0.5 | 0.0 | 17 | 0% | Sticking |
| H | 0.5 | 2.0 | 20 | 18% | Clean |
| I | 0.5 | 4.0 | 22 | 29% | Clean |
| J | 1.0 | 0.0 | 24 | 0% | Sticking |
| K | 1.0 | 2.0 | 25 | 4% | Clean |
| L | 1.0 | 4.0 | 31 | 29% | Clean |

EXAMPLE XXXXVII 1 inch schedule 40 pipe extrusion was carried out using a CM-55 HP twin screw extruder with a commercial TempRite® 3104 CPVC compound using 3 parts of commercial zeolite from Aldrich which had an average particle diameter of 3.1 μm and a 90% and below value of 5.7 μm. The zeolite was dried at 450° C. for 24 hours prior to compounding. A counterrotating intermeshing twin screw extruder, CM55HP, manufactured by Cincinnati Milacron was used to extrude the pipe. The extruder was run at 420° F. with a screw rotation speed of 20 rpm in this Example. The results of the physical properties of the extruded sample (pipe properties) are as follows in Table XVI:

TABLE XVI

| | Control | 1 | 2 |
|---|---|---|---|
| TempRite ® 3104 CPVC | 100 | 100 | 100 |
| Zeolite 4A | — | 3 | 3 |
| % DTS increase | | 118% | 118% |
| Staircase Drop Impact at 73° F. (ft.lb) | 40 ± 3 | 11 ± 1 | 20 ± 4 |
| Staircase Drop Impact at 32° F. (ft.lb) | 10 + 1 | <6 | <6 |
| Vice Crush passes | 3/3 | 3/3 | 3/3 |
| Compression 60% full | 3/3 | 2/3 | 3/3 |
| Pipe Appearance | Good | Very poor (pimples) | Poor |

In this extrusion run, while the thermal stability is increased by the presence of the commercial zeolite, it also reduces the staircase drop impact by 50 to 80% at 73° F. and over 40% at 32° F.; the vice crush test is substantially equivalent in the absence or presence of the zeolite and the pipe appearance is poorer when the large particles size zeolite is used (pimples).

EXAMPLE XXXXVIII

Two compounds were formulated using the 69.7% chlorine two-step CPVC Resin formed described in U.S. Pat. No. 5,216,088. These resins were formulated into compounds using the 69.5% chlorine recipe set forth in Table 3 of European Patent Application EP 808851 A2 with the following modifications: 69.7% chlorine two-step CPVC resin and 3 parts of chlorinated polyethylene were used in this Example as well as 0.25 parts of antioxidant along with commercial Linde 13×zeolite which had been pre-dried for 54 hours at 286° C. followed by cooling under vacuum were made in the following manner. Zeolite 13×had a average particle size of about 5.5 microns and was immediately used to minimize water absorption. The ingredients were mixed in the Farrell intensive mixer, removed at 420° C. and worked on the KSBI 10'×20' mill with the front roller set at 430° F. and the back rollers at 420° F. Plaques were then cut out of the worked material and compression molded to ⅛ inch and ¼ inch thickness using the following Wabash press conditions:

| Pressure setting | 50 tons |
|---|---|
| Pressure Temperature | 410° C. |
| Low pressure | 6 minutes |
| High pressure | 3 minutes |
| Pre-bump dwell | 15 seconds |

-continued

| | |
|---|---|
| Dwell between bumps | 5 seconds |
| Bump open time | 8 seconds |
| Bump counter | 2 |

Bars were cut from the final plaques for Notched Izod according to ASTM D 256-93A, and tensile strength according to ASTM D 638-94B. The results are summarized in Table XVII below:

TABLE XVII

| | | Control | Compound with Zeolite 13X added |
|---|---|---|---|
| 1/4" Notched Izod, 23° C. (ft.lb./in.) | | 1.77 | 0.72 |
| 1/8" Tensile Strength, 23° C. (psi) | | 7810 | 7460 |
| DTS-210° C. 35 rpm, 82 gm cubes | DTS Min. Torque (m-gm) | 2330 | 2330 |
| | DTS Min. Time (minutes) | 6.4 | 12.8 |
| | DTS Temp. (° C.) | 231 | 233 |

This example shows that commercially available zeolite that has been dried increases the thermal stability time as evidenced by the longer DTS time but yield poorer Izod impact values as a result of large particle size.

In summary, novel and unobvious halogen containing polymer compounds with a modified zeolite stabilizer have been described. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

We claim:

1. A halogen containing compound comprising a halogen containing polymer and a zeolite stabilizer, wherein said zeolite has a mean particle diameter in the range of 0.25 to 1.5 microns a <90% value particle diameter of about 0.30 to about 3 microns, and a reduced water content of less than 10 weight percent.

2. A halogen containing compound as claimed in claim 1, wherein said halogen containing polymer is chosen from the group consisting essentially of polyvinyl chloride, chlorinated polyvinyl chloride, polyvinylidene chloride, polyvinyl bromide, polyvinyl fluoride, polyvinylidene fluoride, copolymers of vinyl chloride with a copolymerizable ethylenically unsaturated monomer, vinyl acetate, vinyl butyrate, vinyl benzoate, alkyl fumarates and maleates, vinyl propionate, alkyl acrylates, alkyl methacrylates, methyl alpha-chloracrylates, styrene, vinyl ethers, vinyl ketones, acrylonitrile, chloroacrylonitrile, allylidene diacetate, chloroallylidene diacetate, ethylene and propylene and any combinations of the foregoing.

3. A halogen containing compound as claimed in claim 1, wherein said halogen containing polymer is chlorinated polyvinyl chloride.

4. A halogen containing polymer as claimed in claim 1, wherein said halogen containing polymer is polyvinyl chloride.

5. A halogen containing compound as claimed in claim 1, wherein said zeolite is present in an amount from about 0.5 to about 10 parts per hundred of halogen containing resin.

6. A halogen containing polymer as claimed in claim 2, having a dynamic thermal stability at 220 degrees C. of about 10 to about 60 minutes.

7. A halogen containing polymer as claimed in claim 2 having a Notched Izod in the range of about 1.0 to about 20 (ft.lb/in.).

8. A halogen containing polymer as claimed in claim 2, having a heat distortion temperature in the range of about 80° C. to about 140° C. degrees.

9. A halogen containing polymer as claimed in claim 2, having tensile strength in the range of about 5,000 to about 10,000 psi.

10. A halogen containing polymer as claimed in claim 1, wherein said modified zeolite is a hydrated silicate of aluminum and sodium.

11. A halogen containing polymer as claimed in claim 10, wherein said reduced water content is due to shock annealing.

12. A halogen containing polymer as claimed in claim 10, wherein said reduced water content is due to a coating on said modified zeolite.

13. A halogen containing polymer as claimed in claim 1, wherein said dynamic thermal stability is increased about 10% to about 300% over a control.

14. A method of forming a stabilized halogen containing compound comprising:
    mixing a halogen containing resin with a modified zeolite stabilizer, wherein said zeolite has a particle diameter in the range of 0.25 to 1.5 microns, a <90% value particle diameter of about 0.30 to about 3 microns, and a reduced water content of less than 10 weight percent.

15. A method according to claim 14, wherein said halogen containing polymer is chosen from the group consisting essentially of polyvinyl chloride, chlorinated polyvinyl chloride, polyvinylidene chloride, polyvinyl bromide, polyvinyl fluoride, polyvinylidene fluoride, copolymers of vinyl chloride with a copolymerizable ethylenically unsaturated monomer, vinyl acetate, vinyl butyrate, vinyl benzoate, alkyl fumarates and maleates, vinyl propionate, alkyl acrylates, alkyl methacrylates, methyl alpha-chloracrylates, styrene, vinyl ethers, vinyl ketones, acrylonitrile, chloroacrylonitrile, allylidene diacetate, chloroallylidene diacetate, ethylene and propylene and any combinations of the foregoing.

16. A method according to claim 15, wherein said halogen containing polymer is chlorinated polyvinyl chloride.

17. A method according to claim 15, wherein said halogen containing polymer is polyvinyl chloride.

18. A method according to claim 14, wherein said modified zeolite is present in an amount from about 0.5 to about 10 parts per hundred of halogen containing resin.

19. A method according to claim 16, wherein said halogen containing compound with the modified zeolite has a dynamic thermal stability at 220° C. of about 10 to about 60 minutes.

20. A method according to claim 16, wherein said halogen containing compound with the modified zeolite has a notched izod in the range of about 1.0 to about 20 ft.lb./in.

21. A method according to claim 16, wherein said halogen containing compound with the modified zeolite has a heat distortion temperature in the range of about 80° C. to about 140° C. degrees.

22. A method according to claim 16, wherein said halogen containing compound with the modified zeolite has a tensile strength in the range of about 5,000 to about 10,000 psi.

23. A method according to claim 14, wherein said modified zeolite is a hydrated silicate of aluminum and sodium.

24. A method according to claim 14, wherein said modified zeolite is shock annealed.

25. A method according to claim 14, wherein said modified zeolite is coated with an inorganic, organic, or low molecular weight coating in order to prevent water from entering zeolite.

26. A method according to claim 25, wherein said coating is polymethyl siloxane.

27. A method according to claim 26, wherein said coating is dibutyl thioglycolate.

28. A composition as claimed in claim 1, wherein said zeolite is modified by shock annealing or by coating.

29. A halogen containing compound as claimed in claim 28, wherein said halogen containing polymer is chosen from the group consisting essentially of polyvinyl chloride, chlorinated polyvinyl chloride, polyvinylidene chloride, polyvinyl bromide, polyvinyl fluoride, polyvinylidene fluoride, copolymers of vinyl chloride with a copolymerizable ethylenically unsaturated monomer, vinyl acetate, vinyl butyrate, vinyl benzoate, alkyl fumarates and maleates, vinyl propionate, alkyl acrylates, alkyl methacrylates, methyl alphachloracrylates, styrene, vinyl ethers, vinyl ketones, acrylonitrile, chloroacrylonitrile, allylidene diacetate, chloroallylidene diacetate, ethylene and propylene and any combinations of the foregoing.

30. A halogen containing compound as claimed in claim 29, wherein said halogen containing polymer is chlorinated polyvinyl chloride.

31. A halogen containing polymer as claimed in claim 29, wherein said halogen containing polymer is polyvinyl chloride.

32. A halogen containing polymer as claimed in claim 29, wherein said modified zeolite is present in an amount from about 0.5 to about 10 parts per hundred halogen containing resin.

33. A halogen containing polymer as claimed in claim 30, wherein the water content is less than 8 weight percent.

34. A method according to claim 14, wherein said zeolite is modified by shock annealing or by coating.

35. A method according to claim 34, wherein said halogen containing polymer is chosen from the group consisting essentially of polyvinyl chloride, chlorinated polyvinyl chloride, polyvinylidene chloride, polyvinyl bromide, polyvinyl fluoride, polyvinylidene fluoride, copolymers of vinyl chloride with a copolymerizable ethylenically unsaturated monomer, vinyl acetate, vinyl butyrate, vinyl benzoate, alkyl fumarates and maleates, vinyl propionate, alkyl acrylates, alkyl methacrylates, methyl alpha-chloracrylates, styrene, vinyl ethers, vinyl ketones, acrylonitrile, chloroacrylonitrile, allylidene diacetate, chloroallylidene diacetate, ethylene and propylene and any combinations of the foregoing.

36. A method according to claim 35, wherein said halogen containing polymer is chlorinated polyvinyl chloride.

37. A method according to claim 35, wherein said halogen containing polymer is polyvinyl chloride.

38. A method according to claim 35, wherein said modified zeolite is present in an amount from about 0.5 to about 10 parts per hundred halogen containing resin.

39. A method according to claim 36, wherein the water content is less than 8 weight percent.

* * * * *

UNITED STATES PATENT AND TRADEMARK OFFICE
CERTIFICATE OF CORRECTION

PATENT NO.    : 6,306,945 B1                                                Page 1 of 1
DATED         : October 23, 2001
INVENTOR(S)   : Carole A. Lepilleur et al.

It is certified that error appears in the above-identified patent and that said Letters Patent is hereby corrected as shown below:

<u>Column 26,</u>
Line 14, delete "modified".

Signed and Sealed this

Twenty-first Day of January, 2003

JAMES E. ROGAN
*Director of the United States Patent and Trademark Office*